United States Patent
Wong et al.

(10) Patent No.: US 9,705,415 B2
(45) Date of Patent: Jul. 11, 2017

(54) POWER SUPPLY APPARATUS WITH ACTIVE CLAMPING CIRCUIT

(71) Applicant: Chicony Power Technology Co., Ltd., New Taipei (TW)

(72) Inventors: Man-Chuen Wong, New Taipei (TW); Wing-Kai Chow, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 24 days.

(21) Appl. No.: 14/807,019

(22) Filed: Jul. 23, 2015

(65) Prior Publication Data

US 2017/0025968 A1   Jan. 26, 2017

(51) Int. Cl.

| | |
|---|---|
| *H02M 3/335* | (2006.01) |
| *H02M 3/337* | (2006.01) |
| H02M 3/158 | (2006.01) |
| H02M 1/00 | (2006.01) |
| H02M 1/34 | (2007.01) |

(52) U.S. Cl.
CPC ... *H02M 3/33592* (2013.01); *H02M 3/33507* (2013.01); *H02M 3/158* (2013.01); *H02M 2001/0048* (2013.01); *H02M 2001/342* (2013.01)

(58) Field of Classification Search
CPC ... H02M 2001/0048; H02M 2001/342; H02M 1/32; H02M 3/33538; H02M 3/33553; H02M 3/33592; H02M 3/33576; H02M 3/33546
See application file for complete search history.

(56) References Cited

U.S. PATENT DOCUMENTS

| | | | | |
|---|---|---|---|---|
| 6,687,137 B1* | 2/2004 | Yasumura | ......... | H02M 3/33507 363/21.01 |
| 6,882,548 B1* | 4/2005 | Jacobs | .................... | H02M 1/34 363/127 |
| 2001/0036092 A1* | 11/2001 | Yasumura | ......... | H02M 3/33576 363/21.04 |
| 2004/0240239 A1* | 12/2004 | Ying | .................... | H02M 3/155 363/52 |
| 2014/0133200 A1* | 5/2014 | Sun | ......................... | H02M 1/34 363/50 |

(Continued)

*Primary Examiner* — Timothy J Dole
*Assistant Examiner* — Sisay G Tiku
(74) *Attorney, Agent, or Firm* — Muncy, Geissler, Olds & Lowe, P.C.

(57) ABSTRACT

A power supply apparatus includes a power supply circuit and an active clamping circuit. The power supply circuit includes a secondary side rectifying unit and a voltage output side. The active clamping circuit includes a clamping energy-storing unit, a feedback control unit and a synchronous buck converter. The clamping energy-storing unit clamps and stores a voltage spike to obtain an energy-storing voltage. The feedback control unit detects the energy-storing voltage and informs the synchronous buck converter of the energy-storing voltage. The synchronous buck converter receives the energy-storing voltage and adjusts the energy-storing voltage to obtain an adjusted voltage when the energy-storing voltage is greater than a predetermined voltage. The synchronous buck converter sends the adjusted voltage to the voltage output side.

6 Claims, 4 Drawing Sheets

(56) References Cited

U.S. PATENT DOCUMENTS

| | | | |
|---|---|---|---|
| 2014/0263240 A1* | 9/2014 | Henry | B23K 9/1043 219/130.21 |
| 2015/0131330 A1* | 5/2015 | Pan | H02M 3/07 363/17 |
| 2015/0381075 A1* | 12/2015 | Qu | H02M 3/33576 363/132 |
| 2016/0028317 A1* | 1/2016 | Jung | H02M 3/33507 363/21.01 |

* cited by examiner

POWER SUPPLY APPARATUS WITH ACTIVE CLAMPING CIRCUIT

BACKGROUND OF THE INVENTION

Field of the Invention

The present invention relates to a power supply apparatus, and especially relates to a power supply apparatus with an active clamping circuit.

Description of the Related Art

The power supply apparatus is a common electronic apparatus. The power supply apparatus is used to supply power to the load apparatus to drive the load apparatus. Therefore, the power supply apparatus is very important.

When the power supply apparatus is in operation, the voltage spike is generated easily. The disadvantage of the conventional power supply apparatus is that the diodes of the secondary side rectifying unit of the conventional power supply apparatus are damaged easily due to the voltage spike, and the energy of the voltage spike is not recycled.

SUMMARY OF THE INVENTION

In order to solve the above-mentioned problems, an object of the present invention is to provide a power supply apparatus with an active clamping circuit having low loss.

In order to achieve the object of the present invention mentioned above, the power supply apparatus includes a power supply circuit and the active clamping circuit. The active clamping circuit is electrically connected to the power supply circuit. The power supply circuit includes a secondary side rectifying unit and a voltage output side. The secondary side rectifying unit is electrically connected to the active clamping circuit. The voltage output side is electrically connected to the active clamping circuit and the secondary side rectifying unit. The active clamping circuit includes a clamping energy-storing unit, a feedback control unit and a synchronous buck converter. The clamping energy-storing unit is electrically connected to the secondary side rectifying unit. The feedback control unit is electrically connected to the clamping energy-storing unit. The synchronous buck converter is electrically connected to the clamping energy-storing unit, the feedback control unit and the voltage output side. The clamping energy-storing unit clamps and stores a voltage spike to obtain an energy-storing voltage. The feedback control unit detects the energy-storing voltage and informs the synchronous buck converter of the energy-storing voltage. The synchronous buck converter receives the energy-storing voltage and adjusts the energy-storing voltage to obtain an adjusted voltage when the energy-storing voltage is greater than a predetermined voltage. The synchronous buck converter sends the adjusted voltage to the voltage output side.

The advantage of the present invention is to protect the diodes of the secondary side rectifying unit of the power supply apparatus from the voltage spike. Moreover, the active clamping circuit converts the energy of the voltage spike into the recycled energy to be used as the voltage energy of the output side.

DETAILED DESCRIPTION OF THE INVENTION

Please refer to following detailed description and figures for the technical content of the present invention. The following detailed description and figures are referred for the present invention, but the present invention is not limited to it.

Figure 1:
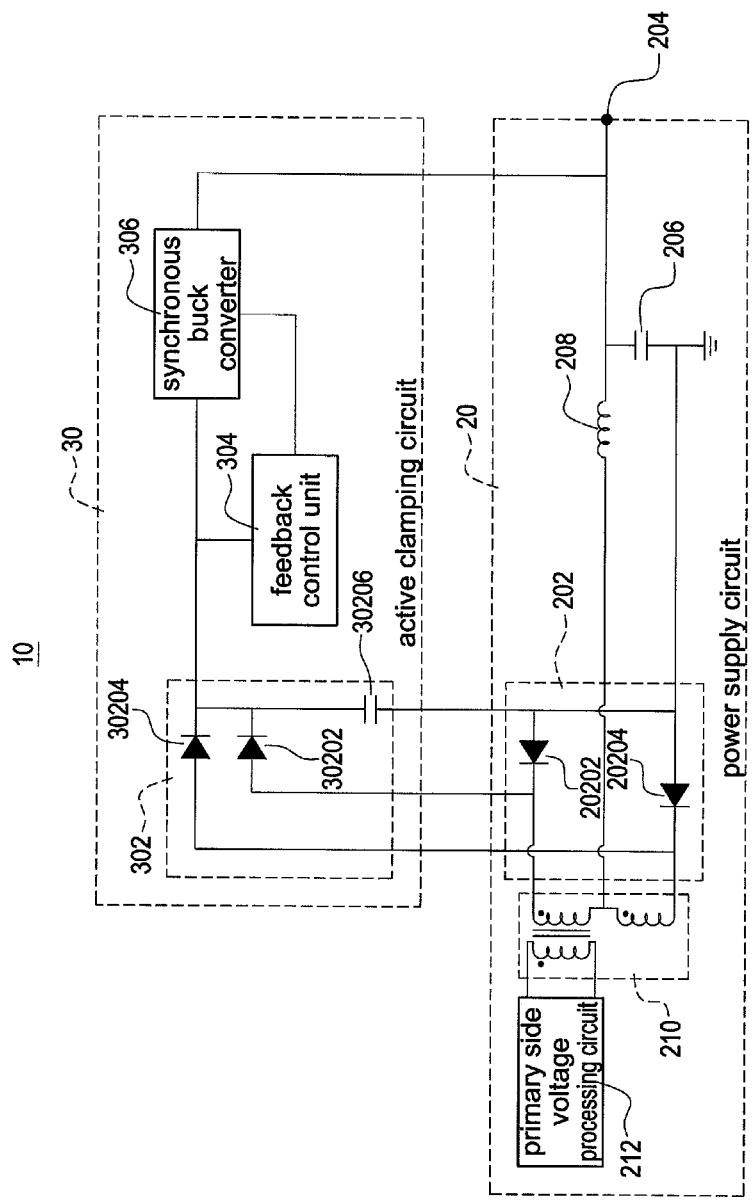
FIG. 1 shows a block diagram of an embodiment of the power supply apparatus of the present invention.

FIG. 1 shows a block diagram of an embodiment of the power supply apparatus of the present invention. A power supply apparatus 10 comprises a power supply circuit 20 and an active clamping circuit 30. The power supply circuit 20 comprises a secondary side rectifying unit 202, a voltage output side 204, an output side capacitor 206, an output side inductor 208, a transformer 210 and a primary side voltage processing circuit 212. The active clamping circuit 30 comprises a clamping energy-storing unit 302, a feedback control unit 304 and a synchronous buck converter 306. The secondary side rectifying unit 202 comprises a first diode 20202 and a second diode 20204. The clamping energy-storing unit 302 comprises a third diode 30202, a fourth diode 30204 and a bulk capacitor 30206.

The active clamping circuit 30 is electrically connected to the power supply circuit 20. The secondary side rectifying unit 202 is electrically connected to the active clamping circuit 30. The voltage output side 204 is electrically connected to the active clamping circuit 30 and the secondary side rectifying unit 202. The output side capacitor 206 is electrically connected to the voltage output side 204. The output side inductor 208 is electrically connected to the voltage output side 204. The transformer 210 is electrically connected to the first diode 20202, the second diode 20204, the third diode 30202, the fourth diode 30204 and the output side inductor 208. The primary side voltage processing circuit 212 is electrically connected to the transformer 210. The first diode 20202 is electrically connected to the clamping energy-storing unit 302. The second diode 20204 is electrically connected to the clamping energy-storing unit 302.

The clamping energy-storing unit 302 is electrically connected to the secondary side rectifying unit 202. The feedback control unit 304 is electrically connected to the clamping energy-storing unit 302. The synchronous buck converter 306 is electrically connected to the clamping energy-storing unit 302, the feedback control unit 304 and the voltage output side 204. The third diode 30202 is electrically connected to the first diode 20202, the feedback control unit 304 and the synchronous buck converter 306. The fourth diode 30204 is electrically connected to the second diode 20204, the third diode 30202, the feedback control unit 304 and the synchronous buck converter 306. The bulk capacitor 30206 is electrically connected to the third diode 30202, the fourth diode 30204, the feedback control unit 304 and the synchronous buck converter 306.

The clamping energy-storing unit 302 clamps and stores a voltage spike to obtain an energy-storing voltage. The feedback control unit 304 detects the energy-storing voltage and informs the synchronous buck converter 306 of the energy-storing voltage. The synchronous buck converter 306 receives the energy-storing voltage and adjusts the energy-storing voltage to obtain an adjusted voltage when the energy-storing voltage is greater than a predetermined voltage. The synchronous buck converter 306 sends the adjusted voltage to the voltage output side 204.

Figure 2:
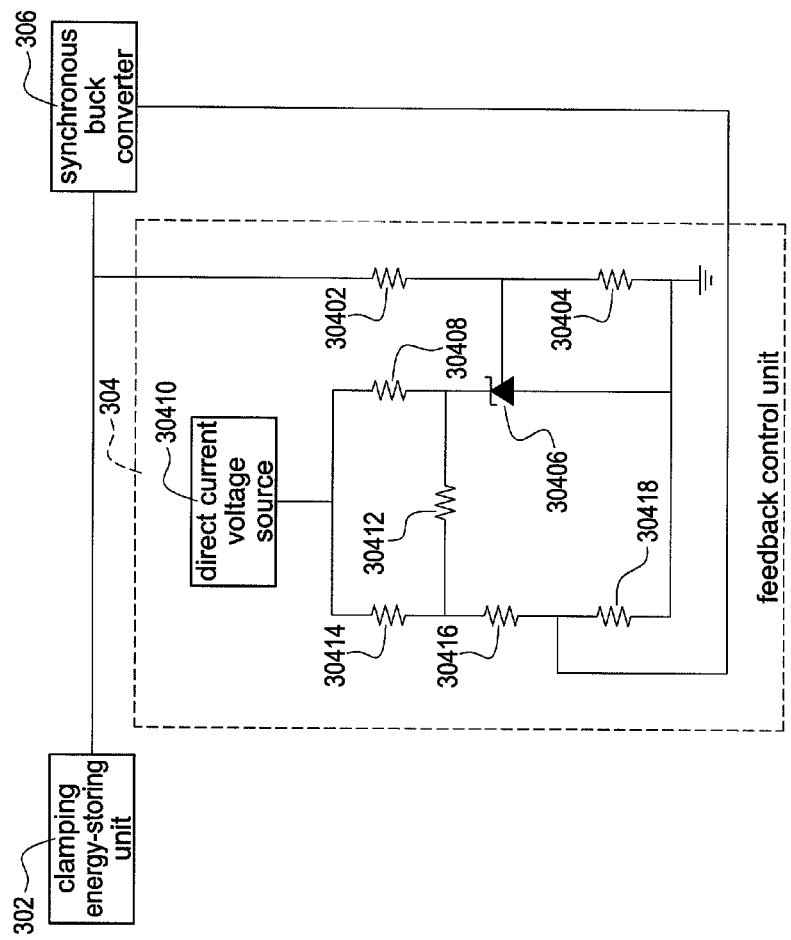
FIG. 2 shows a block diagram of the feedback control unit of the present invention.

FIG. 2 shows a block diagram of the feedback control unit of the present invention. The feedback control unit 304 comprises a first resistor 30402, a second resistor 30404, a three-terminal adjustable regulator 30406, a third resistor 30408, a direct current voltage source 30410, a fourth resistor 30412, a fifth resistor 30414, a sixth resistor 30416 and a seventh resistor 30418.

The first resistor 30402 is electrically connected to the clamping energy-storing unit 302 and the synchronous buck converter 306. The second resistor 30404 is electrically connected to the first resistor 30402. The three-terminal adjustable regulator 30406 is electrically connected to the first resistor 30402 and the second resistor 30404. The third resistor 30408 is electrically connected to the three-terminal adjustable regulator 30406. The direct current voltage source 30410 is electrically connected to the third resistor 30408. The fourth resistor 30412 is electrically connected to the three-terminal adjustable regulator 30406 and the third resistor 30408. The fifth resistor 30414 is electrically connected to the direct current voltage source 30410 and the fourth resistor 30412. The sixth resistor 30416 is electrically connected to the fourth resistor 30412, the fifth resistor 30414 and the synchronous buck converter 306. The seventh resistor 30418 is electrically connected to the sixth resistor 30416 and the synchronous buck converter 306.

Figure 3:
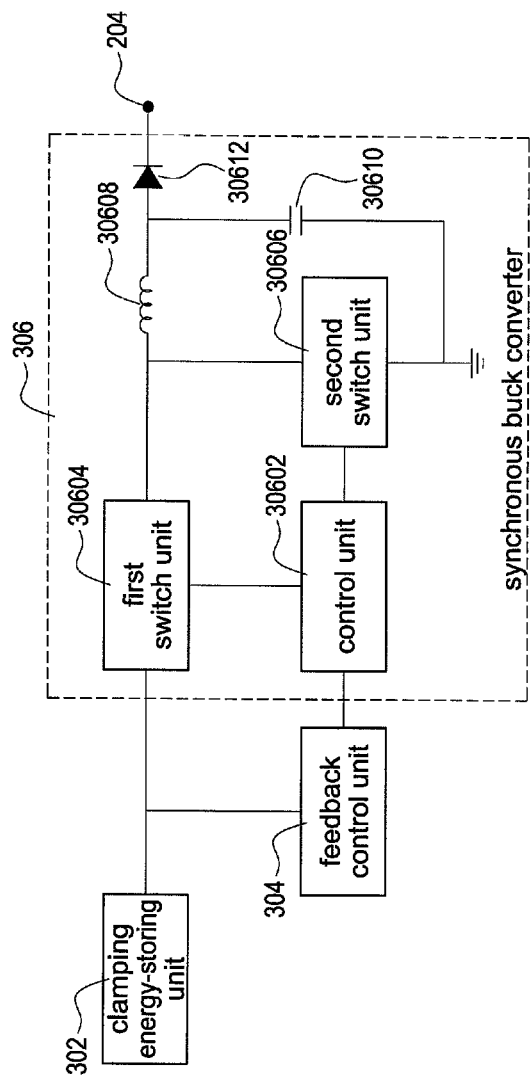
FIG. 3 shows a block diagram of the synchronous buck converter of the present invention.

FIG. 3 shows a block diagram of the synchronous buck converter of the present invention. The synchronous buck converter 306 comprises a control unit 30602, a first switch unit 30604, a second switch unit 30606, an inductor 30608, a capacitor 30610 and a diode 30612.

The control unit 30602 is electrically connected to the feedback control unit 304. The first switch unit 30604 is electrically connected to the control unit 30602, the clamping energy-storing unit 302 and the feedback control unit 304. The second switch unit 30606 is electrically connected to the control unit 30602 and the first switch unit 30604. The inductor 30608 is electrically connected to the first switch unit 30604 and the second switch unit 30606. The capacitor 30610 is electrically connected to the inductor 30608. The diode 30612 is electrically connected to the inductor 30608, the capacitor 30610 and the voltage output side 204.

Please refer to FIG. 1, FIG. 2 and FIG. 3 at the same time. When the voltage spike is generated, the first diode 20202 and the second diode 20204 are damaged easily. The clamping energy-storing unit 302 clamps and stores the voltage spike into the bulk capacitor 30206 to obtain the energy-storing voltage. The feedback control unit 304 detects the energy-storing voltage and informs the synchronous buck converter 306 of the energy-storing voltage. When the energy-storing voltage is greater than the predetermined voltage (for example, 43 volts), the feedback control unit 304 sends a first feedback signal (for example, 0.68 volt) to the control unit 30602, so that the synchronous buck converter 306 receives the energy-storing voltage and adjusts the energy-storing voltage through the first switch unit 30604, the second switch unit 30606, the inductor 30608 and the capacitor 30610 to obtain the adjusted voltage. The synchronous buck converter 306 sends the adjusted voltage to the voltage output side 204 through the diode 30612.

When the energy-storing voltage is not greater than the predetermined voltage, the feedback control unit 304 sends a second feedback signal (for example, 1.1 volts) to the control unit 30602, so that the control unit 30602 stops controlling the first switch unit 30604 and the second switch unit 30606.

In an embodiment, the control unit 30602 has a threshold voltage (for example, 0.8 volt). When the feedback control unit 304 sends the first feedback signal (for example, 0.68 volt) to the control unit 30602, the control unit 30602 determines that the first feedback signal is less than the threshold voltage, so that the control unit 30602 controls the switching operation of the first switch unit 30604 and the second switch unit 30606. When the feedback control unit 304 sends the second feedback signal (for example, 1.1 volts) to the control unit 30602, the control unit 30602 determines that the second feedback signal is not less than the threshold voltage, so that the control unit 30602 stops controlling the switching operation of the first switch unit 30604 and the second switch unit 30606.

Figure 4:
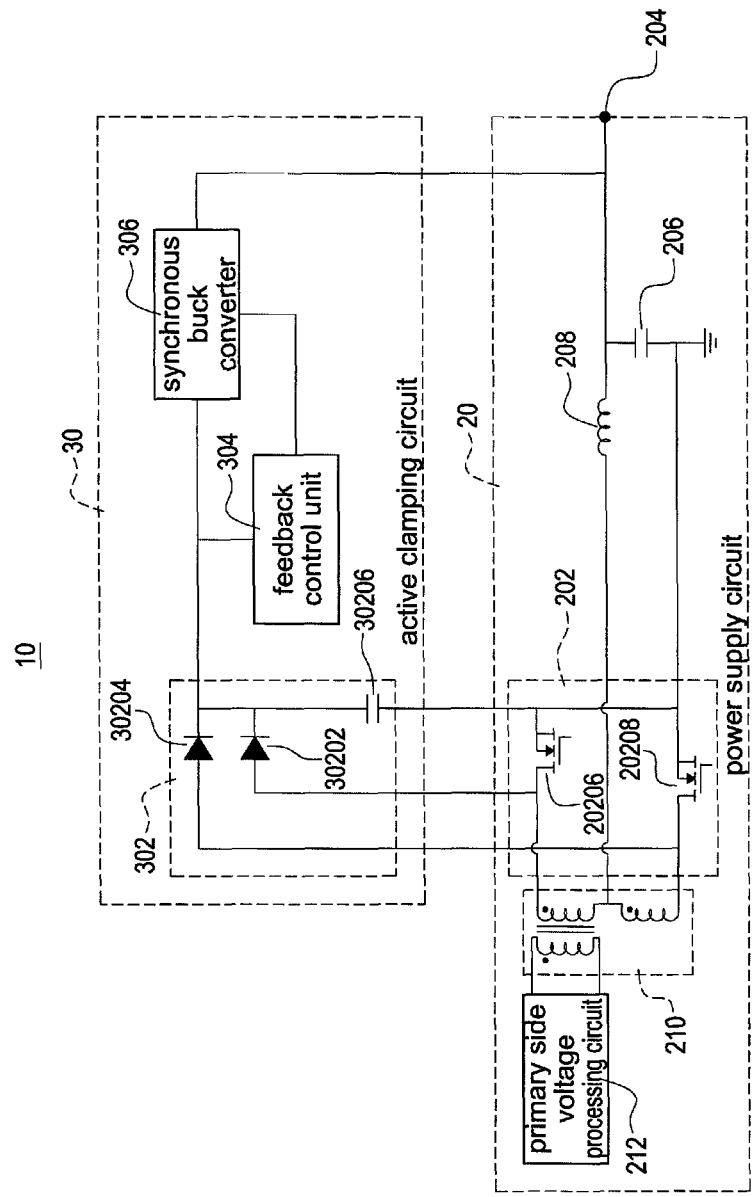
FIG. 4 shows a block diagram of another embodiment of the power supply apparatus of the present invention.

FIG. 4 shows a block diagram of another embodiment of the power supply apparatus of the present invention. The description for the elements shown in FIG. 4, which are similar to those shown in FIG. 1, is not repeated here for brevity. Moreover, the first diode 20202 and the second diode 20204 are replaced by a first synchronous rectifying switch 20206 and a second synchronous rectifying switch 20208. The first synchronous rectifying switch 20206 is electrically connected to the clamping energy-storing unit 302. The second synchronous rectifying switch 20208 is electrically connected to the clamping energy-storing unit 302. Moreover, the first synchronous rectifying switch 20206 can be a metal oxide semiconductor field effect transistor. The second synchronous rectifying switch 20208 can be a metal oxide semiconductor field effect transistor.

The advantage of the present invention is to protect the diodes of the secondary side rectifying unit of the power supply apparatus from the voltage spike. Moreover, the active clamping circuit converts the energy of the voltage spike into the recycled energy to be used as the voltage energy of the output side.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus comprising:
   a power supply circuit; and
   an active clamping circuit electrically connected to the power supply circuit,
   wherein the power supply circuit comprises:
      a secondary side rectifying unit comprising a first diode and a second diode, and the secondary side rectifying unit electrically connected to the active clamping circuit; and
      a voltage output side electrically connected to the active clamping circuit and the secondary side rectifying unit,
   wherein the active clamping circuit comprises a clamping energy-storing unit, a feedback control unit, and a synchronous buck converter; the clamping energy-storing unit electrically connected to the secondary side rectifying unit, and the clamping energy-storing unit comprising:
      a third diode electrically connected to the first diode of the secondary side rectifying unit, the feedback control unit, and the synchronous buck converter;

a fourth diode electrically connected to the second diode of the secondary side rectifying unit, the third diode, the feedback control unit, and the synchronous buck converter; and a bulk capacitor electrically connected to the third diode, the fourth diode, the feedback control unit, and the synchronous buck converter, wherein the feedback control unit electrically is connected to the clamping energy-storing unit, and the feedback control unit comprises:

a first resistor electrically connected to the clamping energy-storing unit;

a second resistor electrically connected to the first resistor;

a three-terminal adjustable regulator electrically connected to the first resistor and the second resistor;

a third resistor electrically connected to the three-terminal adjustable regulator;

a direct current voltage source electrically connected to the third resistor; and a fourth resistor electrically connected to the three-terminal adjustable regulator and the third resistor; and the synchronous buck converter electrically connected to the clamping energy-storing unit and the first resistor of the feedback control unit, the feedback control unit and the voltage output side, and wherein the clamping energy-storing unit clamps and stores a voltage spike to obtain an energy-storing voltage; the feedback control unit detects the energy-storing voltage and informs the synchronous buck converter of the energy-storing voltage; the synchronous buck converter receives the energy-storing voltage and adjusts the energy-storing voltage to obtain an adjusted voltage when the energy-storing voltage is greater than a predetermined voltage; the synchronous buck converter sends the adjusted voltage to the voltage output side.

2. The power supply apparatus in claim 1, wherein the feedback control unit further comprises:

a fifth resistor electrically connected to the direct current voltage source and the fourth resistor;

a sixth resistor electrically connected to the fourth resistor, the fifth resistor and the synchronous buck converter; and a seventh resistor electrically connected to the sixth resistor and the synchronous buck converter.

3. The power supply apparatus in claim 2, wherein the synchronous buck converter comprises:

a control unit electrically connected to the feedback control unit;

a first switch unit electrically connected to the control unit, the clamping energy-storing unit and the feedback control unit;

a second switch unit electrically connected to the control unit and the first switch unit;

an inductor electrically connected to the first switch unit and the second switch unit;

a capacitor electrically connected to the inductor; and a diode electrically connected to the inductor, the capacitor and the voltage output side.

4. The power supply apparatus in claim 3, wherein the power supply circuit further comprises:

an output side capacitor electrically connected to the voltage output side;

an output side inductor electrically connected to the voltage output side;

a transformer electrically connected to the first diode, the second diode, the third diode, the fourth diode and the output side inductor; and a primary side voltage processing circuit electrically connected to the transformer.

5. The power supply apparatus in claim 1, wherein the secondary side rectifying unit comprises:

a first synchronous rectifying switch electrically connected to the clamping energy-storing unit; and a second synchronous rectifying switch electrically connected to the clamping energy-storing unit.

6. The power supply apparatus in claim 5, wherein the first synchronous rectifying switch is a metal oxide semiconductor field effect transistor; the second synchronous rectifying switch is a metal oxide semiconductor field effect transistor.

* * * * *